(12) United States Patent
Frommherz

(10) Patent No.: US 7,134,674 B2
(45) Date of Patent: Nov. 14, 2006

(54) SHOPPING TROLLEY

(75) Inventor: Bernd Frommherz, Wutöschingen/Horheim (DE)

(73) Assignee: Wanzl Metallwarenfabrik GmbH, Leipheim (DE)

(*) Notice: Subject to any disclaimer, the term of this patent is extended or adjusted under 35 U.S.C. 154(b) by 82 days.

(21) Appl. No.: 10/679,280

(22) Filed: Oct. 7, 2003

(65) Prior Publication Data
US 2005/0040615 A1    Feb. 24, 2005

Related U.S. Application Data

(63) Continuation of application No. PCT/DE02/04418, filed on Dec. 3, 2002.

(30) Foreign Application Priority Data
Dec. 4, 2001  (DE) ............... 101 59 376

(51) Int. Cl.
B62B 3/00 (2006.01)

(52) U.S. Cl. .................. 280/33.992; 224/411

(58) Field of Classification Search ......... 280/33.991, 280/33.992, 33.996; 224/401, 409, 411; 24/326, 336, 340, 351
See application file for complete search history.

(56) References Cited

U.S. PATENT DOCUMENTS

| | | | | |
|---|---|---|---|---|
| 3,588,083 | A | * | 6/1971 | Callanan .................. 269/98 |
| 3,912,291 | A | * | 10/1975 | Frisch .................. 280/33.992 |
| 4,376,502 | A | * | 3/1983 | Cohen .................. 224/411 |
| 4,589,794 | A | * | 5/1986 | Sugiura et al. ............. 403/187 |
| 4,703,396 | A | * | 10/1987 | Fletcher ................ 361/809 |
| 5,012,966 | A | | 5/1991 | Sawyer et al. |
| 5,836,422 | A | * | 11/1998 | Hurst .................... 186/63 |
| 5,836,596 | A | * | 11/1998 | Wanzl ............... 280/33.991 |
| 6,152,340 | A | * | 11/2000 | Chen et al. ............... 224/409 |
| 6,186,382 | B1 | * | 2/2001 | Bergin et al. .............. 224/411 |
| 6,406,041 | B1 | | 6/2002 | Rea |

FOREIGN PATENT DOCUMENTS

| | | |
|---|---|---|
| DE | 89 13 394 | 4/1990 |
| DE | 202 05 502 | 7/2002 |
| DE | 202 09 885 | 9/2002 |
| FR | 2 523 060 | 9/1983 |
| FR | 2 795 033 | * 12/2000 |

* cited by examiner

Primary Examiner—Frank Vanaman
(74) Attorney, Agent, or Firm—Buchanan Ingersoll & Rooney PC

(57) ABSTRACT

A shopping trolley (1) with a basket (2) includes a small-item tray (13) fixed to the inside (4) of its end wall (3). The end wall (3) of the shopping trolley, starting from its upper edge (7), has an indentation (11) on which the small-item tray (13) is supported, and in that a clamping strip (20) is provided for closing the indentation (11) and for additionally securing the small-item tray (13).

6 Claims, 1 Drawing Sheet

SHOPPING TROLLEY

CROSS-REFERENCE TO RELATED APPLICATIONS

The present application is a continuation of PCT/DE02/04418, filed on Dec. 3, 2002, and which claims the priority of DE 101 59 376.7, filed in Germany on Dec. 4, 2001. The contents of PCT/DE02/04418 and DE 101 59 376.7 are incorporated herein by reference.

BACKGROUND OF THE INVENTION

1. Field of the Invention

The invention relates to a shopping trolley with a basket, wherein a small-item tray is fixed to the inside of its end wall.

2. Discussion of Related Art

In known shopping trolleys, the means necessary for mounting a small-item tray are formed by hook- or lug-type elements which, being visible, spoil the effect, in particular on the end wall of the basket.

OBJECTS AND SUMMARY

In a shopping trolley of the present type, an object of the invention is to select and form mounting means, which are necessary for fixing the small-item tray to the end wall of the basket, in such a way that they do not spoil the effect.

In one embodiment, the object is achieved in that the end wall, starting from its upper edge, has an indentation on which the small-item tray is supported, and in that a clamping strip is provided for closing the indentation and for additionally securing the small-item tray.

The clamping strip is of particular importance because, advantageously, it is not only suitable for additionally securing the small-item tray, but it also covers the indentation in the end wall and those elements on the small-item tray which are provided for supporting the small-item tray on the indentation. The clamping strip does not spoil the effect in the manner typical of hook- or lug-type elements, even less so when, according to one embodiment of the invention, the clamping strip is quite deliberately in the form or shape of a gripping strip.

BRIEF DESCRIPTION OF THE DRAWINGS

The embodiments of the invention will be further described with reference to drawings, wherein.

DETAILED DESCRIPTION OF THE PREFERRED EMBODIMENTS

Figure 1:
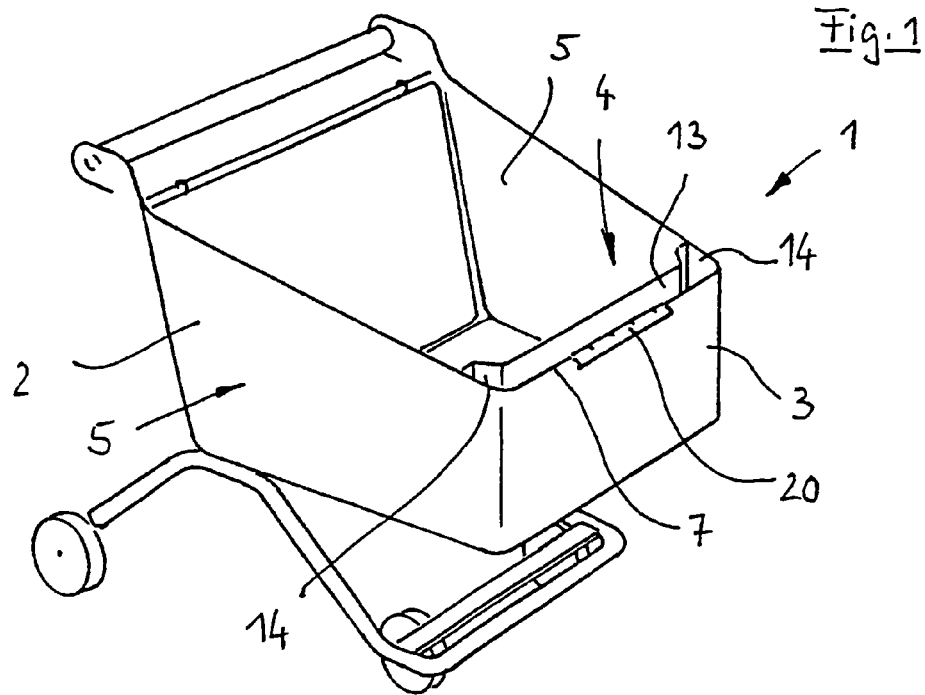
FIG. 1 shows a shopping trolley, with a view of the end wall of the basket.

The shopping trolley 1 shown in FIG. 1, which is nestable with like trolleys, corresponds to the generally known, well-established type of shopping trolley 1. A description of details necessary for the present invention is therefore superfluous.

A small-item tray 13 is fixed to the inside 4 of the end wall of the basket 2 and is intended to hold articles such as cream or yoghurt cartons which are sensitive to pressure. The small-item tray 13 ends with its two sides 14 against the side wails 5 of the basket 2 and is screwed thereto with screws 26. A clamping strip 20, which has a U-shaped cross-section and the function of which will be described herein below, is arranged on the upper edge 7 of the end wall 3.

Figure 2:
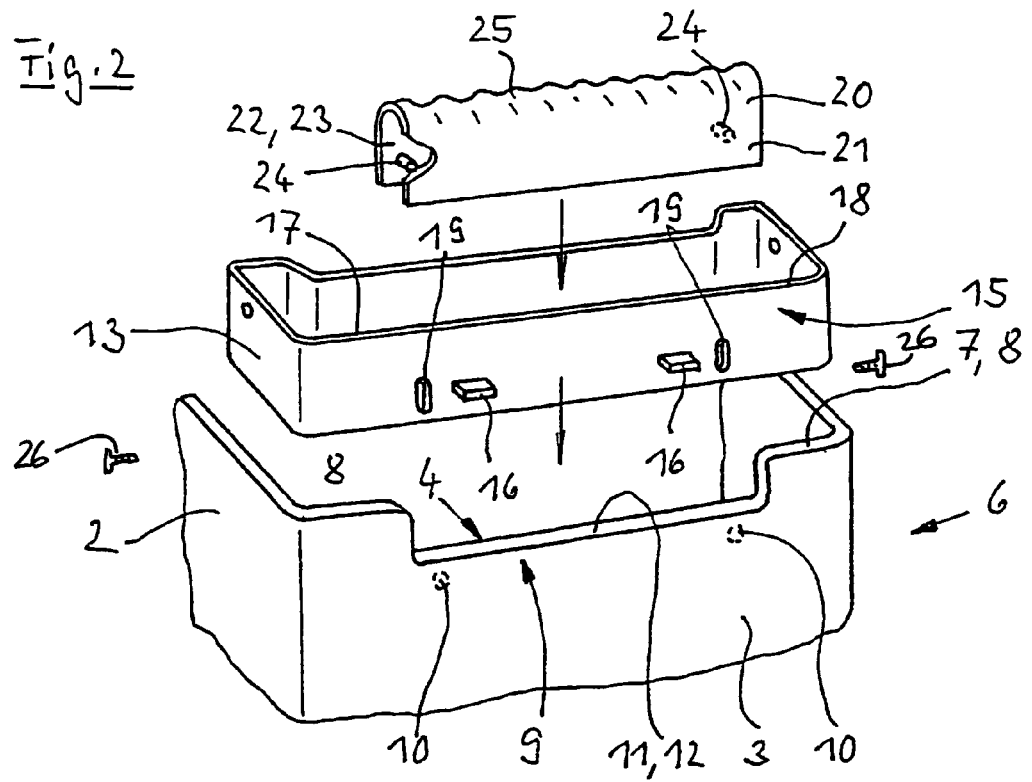
FIG. 2 shows the process of mounting and securing a small-item tray according to an embodiment of the present invention.

FIG. 2 shows the front region 6 of the basket 2 together with its end wall 3. An indentation 11 extends downwards from the upper edge 7 of the end wall 3. The small-item tray 13, which is mountable on the end wall 3 in the direction of the arrow, is shown at a vertical distance from the end wall 3. Projections 16 are provided on the front wall 15 of the small-item tray 13 and are intended to support the small-item tray 13 on the horizontal portion 12 of the indentation 11. When mounted, the small-item tray 13 rests against the inside 4 of the end wall 3, the upper edge 17 of the small-item tray 13 lying in approximately the same horizontal plane as the two upper edge portions 8 of the end wall 3. The clamping strip 20 is shown above the small-item tray 13 and is mountable on the small-item tray 13 and on the indentation 11 of the end wall 3 from above. When mounted, the clamping strip 20, which is as wide as the indentation 11, engages over the upper edge 18 of the front wall 15 of the small-item tray 13 and lies with its front arm 21 against a narrow horizontal region 9, which adjoins the indentation 11 on the outside of the end wall 3. On the inner wall 23 of the rear arm 22, projections 24 are provided which extend through holes 19 in the front wall 15 of the small-item tray 13 when the clamping strip 20 is mounted. The projections 24 finish in recesses 10 on the inside 4 of the end wall 3 just below the indentation 11. By being suitably formed, the projections 24 engage in the recesses 10 in a snap-locking manner so that the clamping strip 20, which is correspondingly formed, is clamped to the front wall 15 of the small-item tray 13 and to the end wall 3 of the basket 2. The clamping strip 20 therefore closes the indentation 11 and additionally secures the small-item tray 13. The top of the clamping strip 20 is preferably provided with gripping grooves 25 so that the clamping strip 20 thereby loses the character of a securing means.

The basket 2, the small-item tray 13 and the clamping strip 20 are preferably made of plastic.

Although only preferred embodiments are specifically illustrated and described herein, it will be appreciated that many modifications and variations of the present invention are possible in light of the above teachings and within the purview of the appended claims without departing from the spirit and intended scope of the invention.

The invention claimed is:

1. A shopping trolley with a basket, the shopping trolley comprising an end wall and a small-item tray fixed to an inside of the end wall of the shopping trolley, the end wall, starting from an upper edge of the end wall, has an indentation on which the small-item tray is supported, and a separate clamping strip is provided to clip over both a portion of the small-item tray and a portion of the end wall so as to close the indentation and for additionally securing the small-item tray to the end wall, wherein the clamping strip has a front and a rear arm and, on the rear arm, projections are provided which extend through holes in the small-item tray when the clamping strip is mounted and finish in recesses on the inside of the end wall.

2. A shopping trolley with a basket, the shopping trolley comprising an end wall and a small-item tray fixed to an inside of the end wall of the shopping trolley, the end wall has an indentation at an upper edge thereof, the small-item tray includes projections which rest on an upper edge of the indentation to support the small-item tray on the end wall, and a clamping strip is provided to clip over both a portion of the small-item tray and a portion of the end wall so as to close the indentation and to secure the small-item tray to the end wall, wherein the clamping strip has a front and a rear arm and, on the rear arm, projections are provided which extend through holes in the small-item tray when the clamping strip is mounted and finish in recesses on the inside of the end wall.

3. The shopping trolley according to claim 2, wherein the clamping strip is connected in a snap-locking manner to the end wall of the basket.

4. The shopping trolley according to claim 2, wherein the clamping strip has a U-shaped cross-section.

5. The shopping trolley according to claim 2, wherein a top of the clamping strip is provided with gripping grooves.

6. A shopping trolley, comprising:
   an end wall having an indentation at an upper edge thereof;
   a small-item tray fixed to an inside of the end wall, the small-item tray including a substantially flat wall;
   the small-item tray further includes projections which rest on an upper edge of the indentation to support the small-item tray on the shopping trolley such that the substantially flat wall of the small-item tray is substantially parallel to the end wall of the shopping trolley; and
   a clamping strip is provided to clip over both a portion of the small-item tray flat wall and a portion of the end wall so as to fill in the indentation and to secure the small-item tray to the end wall shopping trolley
   wherein the clamping strip has a front and a rear arm and, on the rear arm, projections are provided which extend through holes in the small-item tray when the clamping strip is mounted and finish in recesses on the inside of the end wall.

* * * * *